United States Patent Office 2,983,439
Patented May 9, 1961

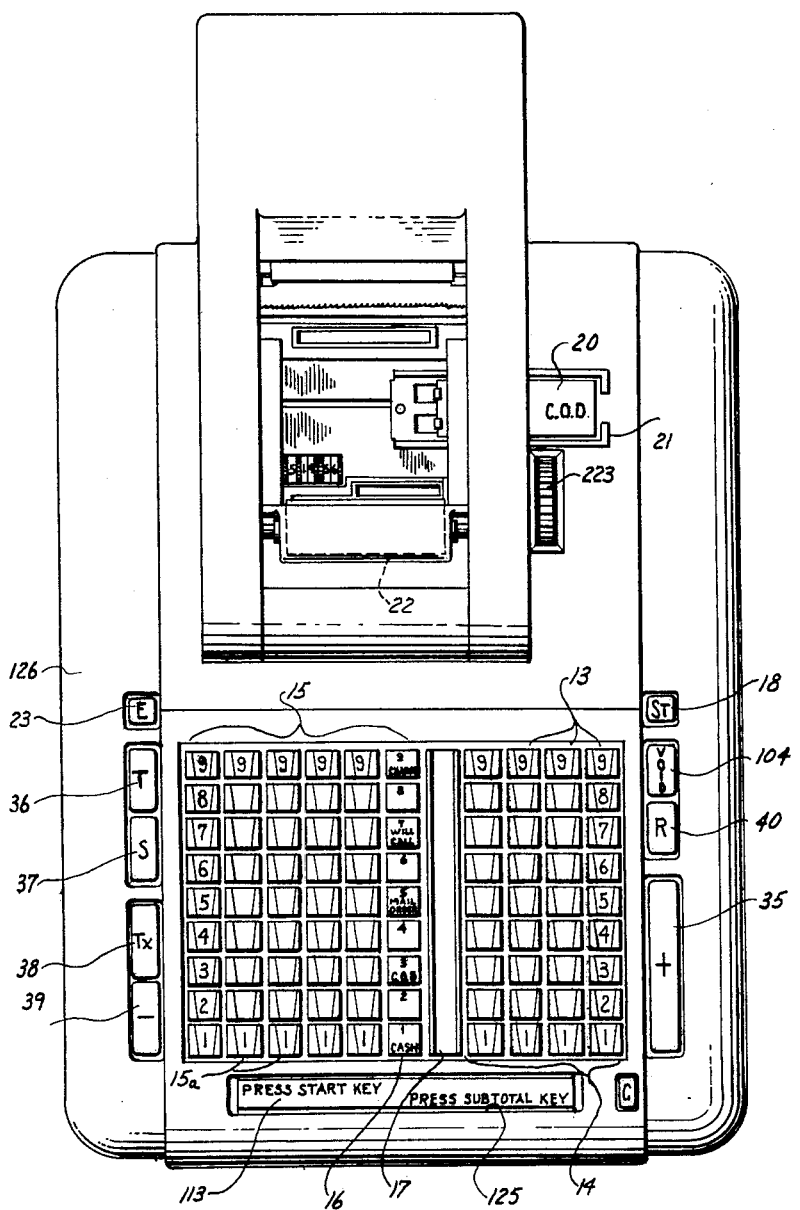
FIG. I

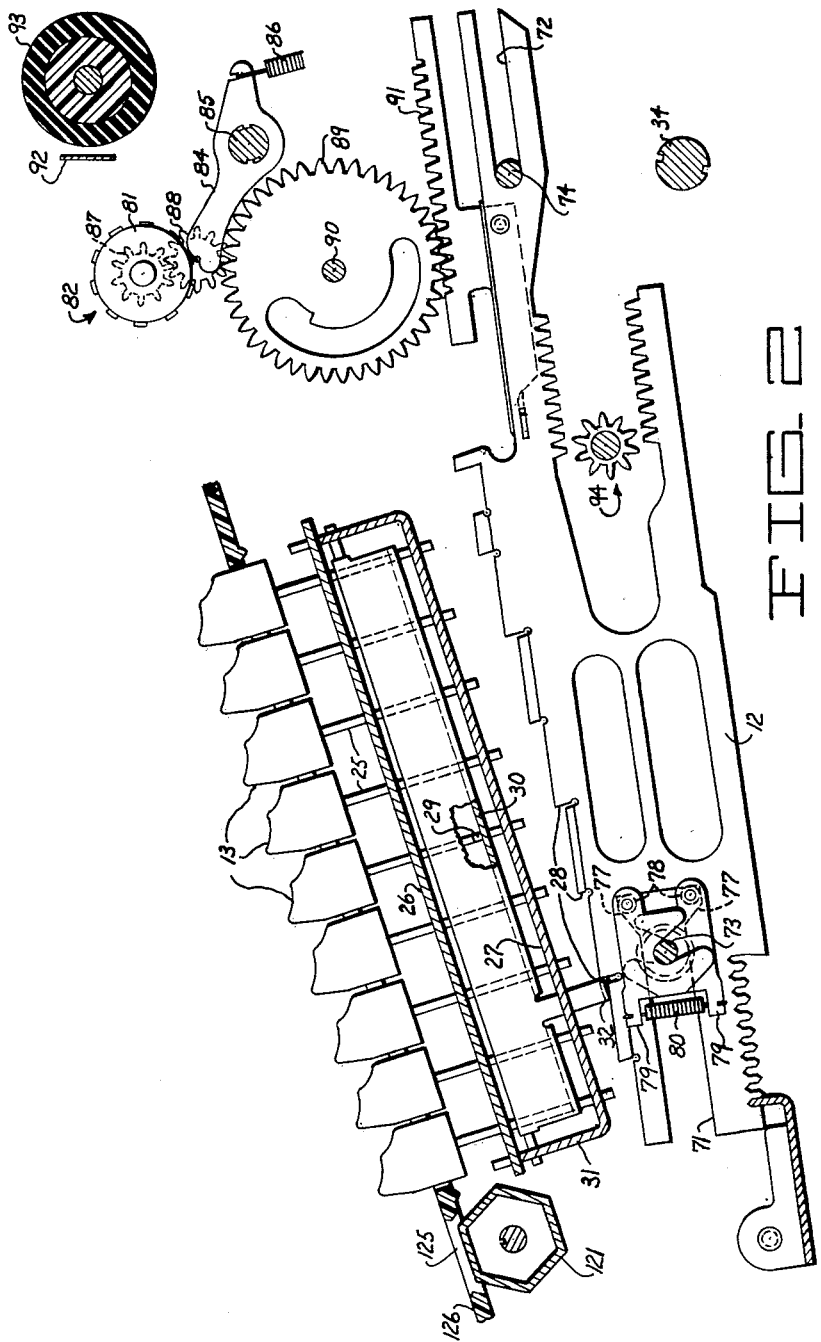

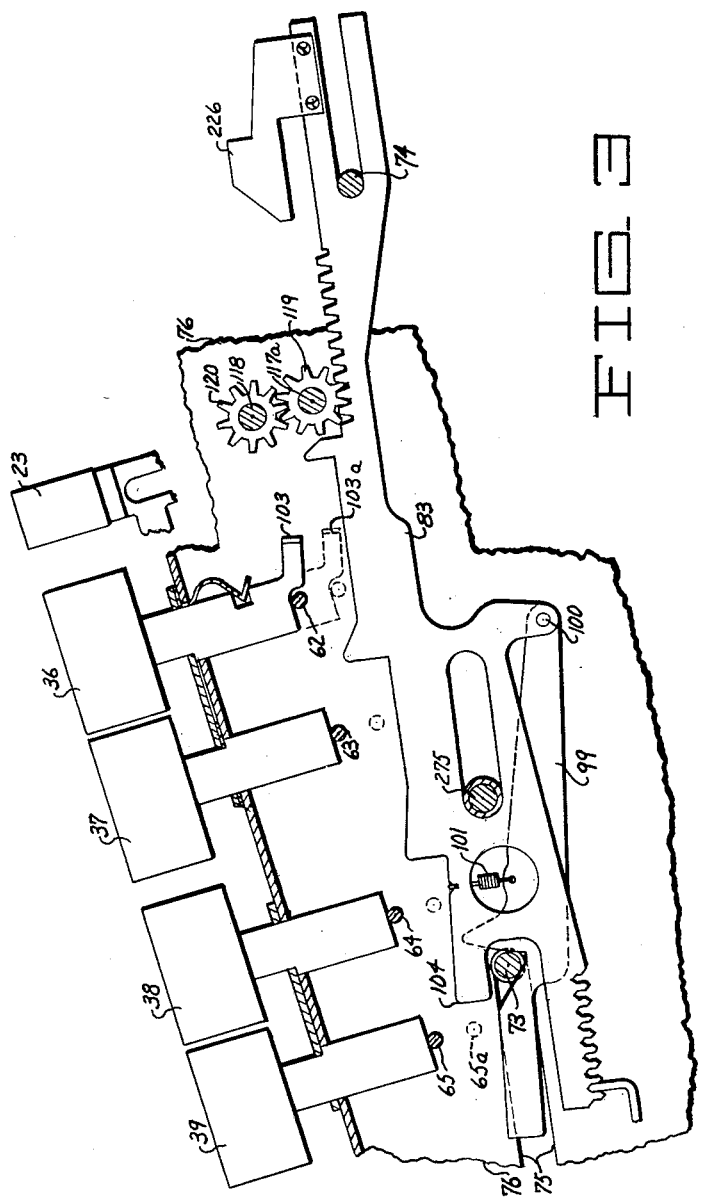

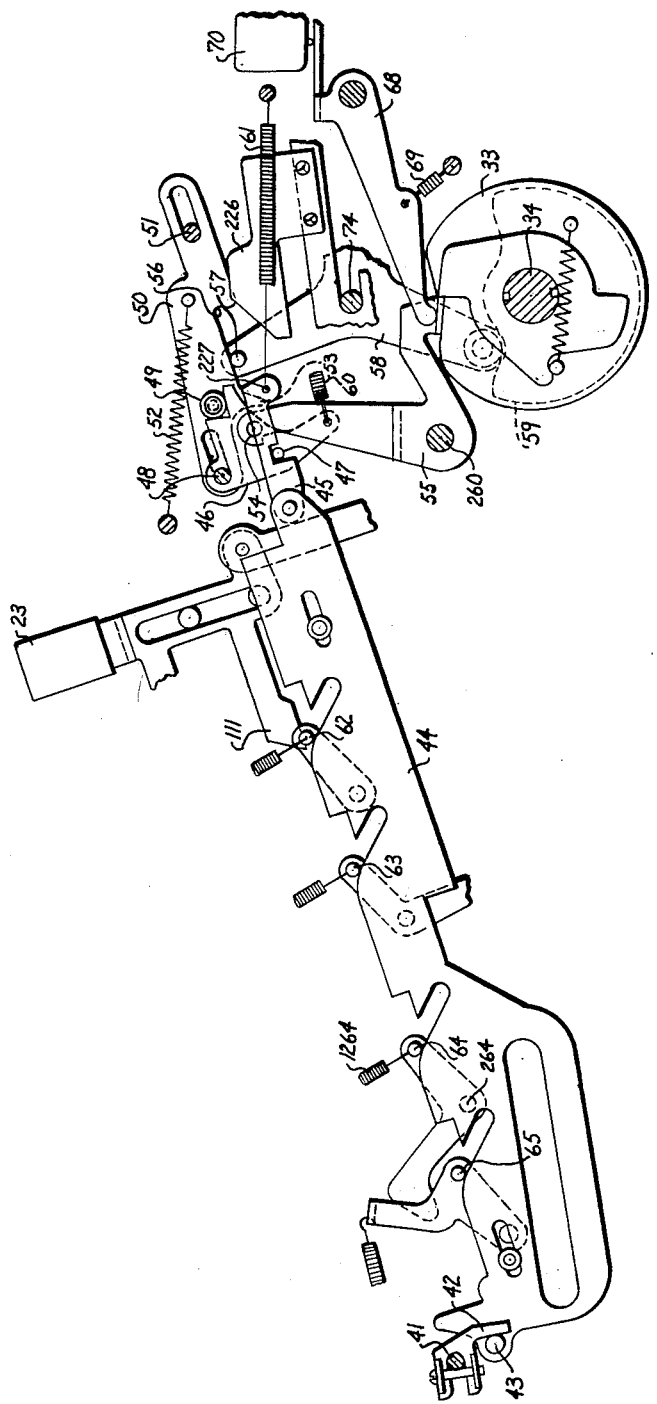

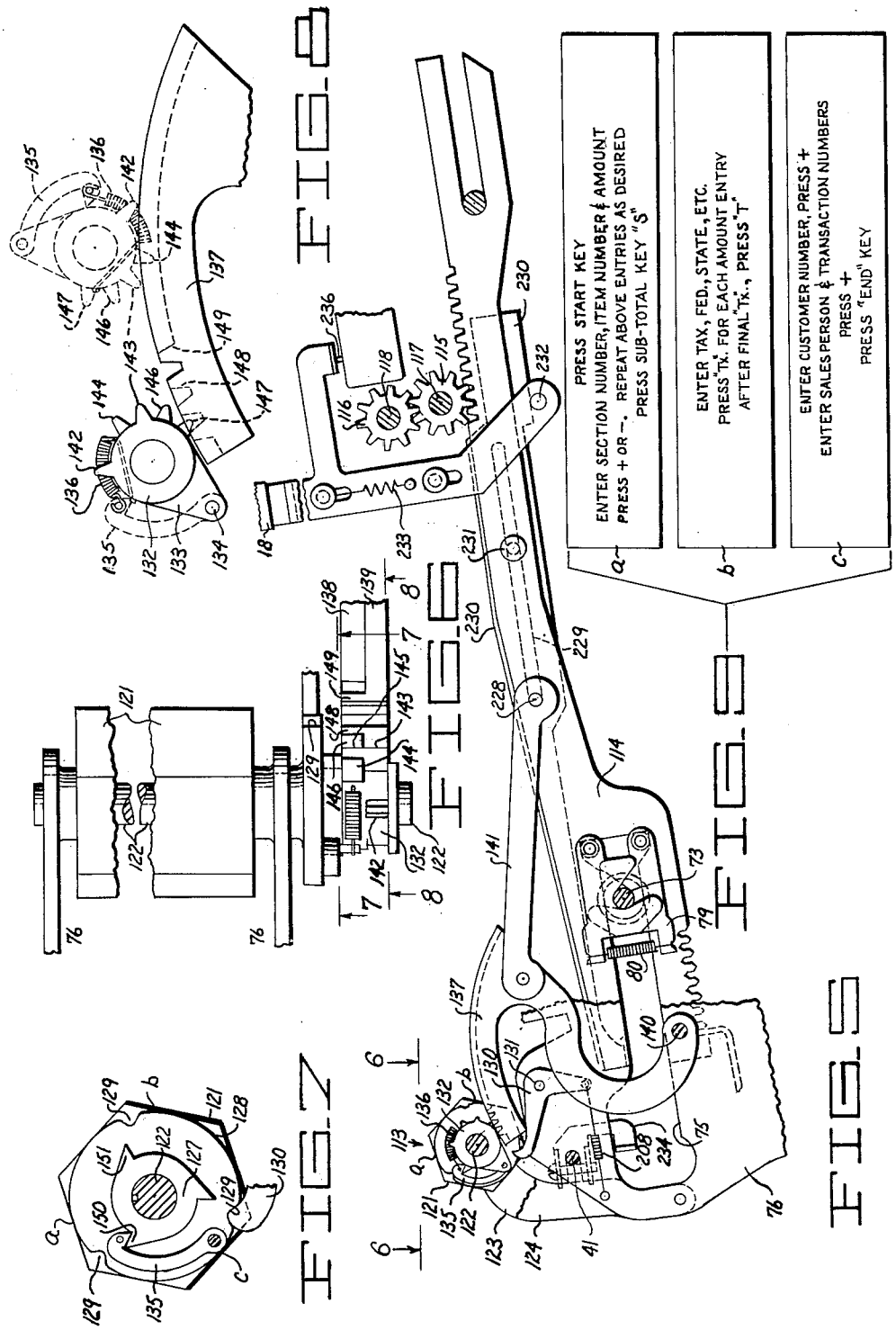

2,983,439

SALES TRANSACTION APPARATUS

Robert E. Boyden, Ithaca, N.Y., and Milton V. Scozzafava, Arcadia, and Alpheus F. Stansell, San Lorenzo, Calif., assignors to Clary Corporation, San Gabriel, Calif., a corporation of California Original application Oct. 25, 1956, Ser. No. 618,345, now Patent No. 2,894,449, dated July 14, 1959. Divided and this application Feb. 16, 1959, Ser. No. 793,389

5 Claims. (Cl. 235—23)

This invention relates to data processing equipment and has particular reference to a business machine for aiding and registering sales transactions.

In machines of the above type, such as that disclosed in the copending application of R. E. Boyden et al., Serial No. 618,345, filed October 25, 1956, which matured into Patent 2,894,449, issued on July 14, 1959, of which the present aplication is a division, the procedure in registering a sales transaction may require that the machine will be operated through a program of sequentially different steps.

Generally machines of the above type are controlled by amount keys on which amounts are set and by control keys or bars, each of which controls the machine to perform a particular operation such as totaling, subtotaling, subtracting, etc.

In sales transaction registering machines and others of a similar nature, successively different operations of the machine are necessary, for example, to register each sales transaction and it frequently occurs that a clerk may forget the proper sequence. Although a program list of operations may be referred to, it has been found, due to distractions and delays occurring during the sales transaction, that the clerk is prone to forget which operations have been completed, or in other words, where he is in a series of steps necessary to complete the transaction, hereby possibly repeating or omiting an essential operation of the machine.

It therefore becomes a principal object of the present invention to provide a program indicating mechanism for indicating to the operator of a machine of the above class, the different types of operations to be performed.

Another object is to provide a program indicating mechanism for indicating to the operator at each of several steps in a program, the succeeding step or steps to be performed.

The manner in which the above and other objects of the invention are accomplished will be readily understood on reference to the following specification when read in conjunction with the accompanying drawings, wherein:

Fig. 1 is a plan view of a sales transaction registering machine embodying the present invention.

Fig. 2 is a longitudinal sectional view through the machine.

Fig. 3 is a sectional view illustrating the main symbol rack and its controls.

Fig. 4 is a sectional view of the clutch and its controls.

Fig. 5 is a sectional view of the program indicating drum and controls therefor.

Fig. 6 is a plan view of the program drum and is taken substantially along the line 6—6 of Fig. 5.

Fig. 7 is a sectional view taken along 7—7 of Fig. 6.

Fig. 8 is an enlarged sectional view of part of the drum driving mechanism and is taken substantially along the line 8—8 of Fig. 6.

Fig. 9 is a developed view of the three indicating faces of the drum.

Figure 10:
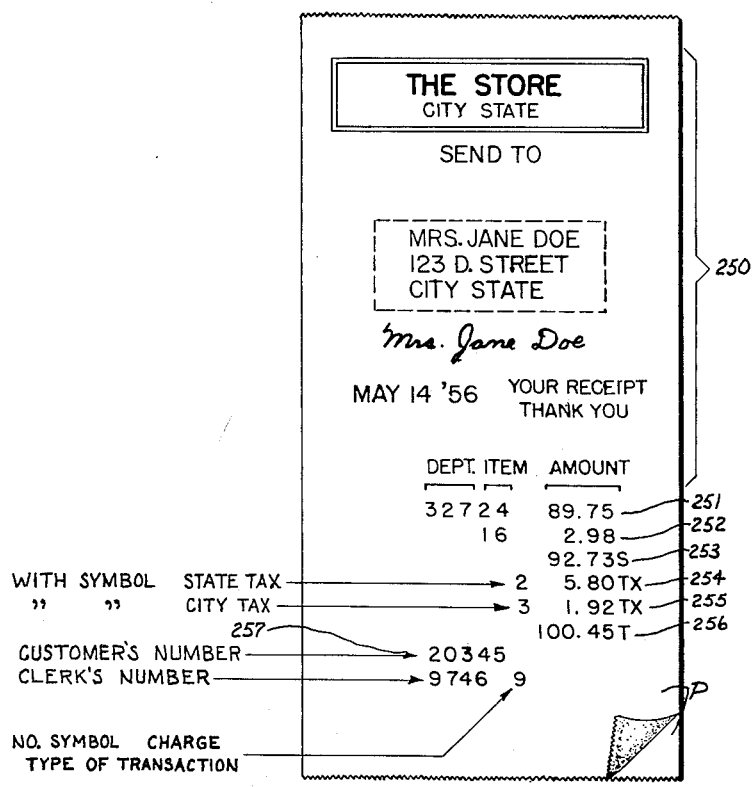
Fig. 10 is a view of a sample receipt as produced by the machine.

Reference is hereby made to the above R. E. Boyden et al. application and to the R. E. Boyden Patent No. 2,583,810, issued on January 29, 1952, for details of the machine not specifically disclosed herein. However, it is to be understood that the invention may be equally well applied with obvious modifications, to machines of other types.

The machine is of the full keyboard type and comprises four rows of denominationally arranged differential actuator racks 12 (Fig. 2) each controlled by a row of nine amount keys 13 located at the right hand side of the machine. These racks control an amount printer generally indicated at 82. A plurality of like racks (not shown) located at the left hand side of the machine are controlled by keys 15 similar to the amount keys but intended only to control an identification printer section.

The right hand keyboard section 14 is provided to enter the amount of items included in the sales transaction and the left hand section 15 is provided to enter various identification data pertaining to sales transactions, as indicated on the sample receipt illustrated in Fig. 10.

Describing first the general operation of the machine, it is assumed that the same has been cleared beforehand by depression of an end-of-transaction bar 23 which has also released a normally depressed start key or bar 18 (Fig. 1). The clerk now enters the store department number in any of the first three rows of keys at the left in section 15, the catalog number of the first item purchased in the next two rows to the left in section 15, and then the amount in section 13. Assuming that the start key 18 has been depressed to unlock the control bars of the machine, an add bar 35 is now depressed, thereby entering the amount into an accumulator, generally indicated at 94 and causing the printer 82 to print the numerical data upon a tape P as indicated by the first horizontally printed line 251 in Fig. 10.

One or more additional item entries may be made including item catalog number and amount, and upon depression of the add bar after each item entry, these are printed as, for example, at 252 (Fig. 10). Following entry of all items comprising a transaction, a subtotal is obtained as indicated at 253 by depressing a subtotal bar 37 to form the basis of computing the taxes. Such tax is then entered into the keyboard. The type of tax is entered by depressing an appropriate key in a row 16 and a tax bar 38 is depressed, two lines of such taxes being printed as at 254 and 255. A total is then obtained by depressing the total bar 36 and the total is printed as at 256.

Additional identification data such as the customer's number, clerk's number, etc., is entered in the left hand section 15, and the add bar is depressed to print the same as indicated at 257. Thereafter, the end-of-transaction bar 23 is depressed causing the cycle to clear the machine preparatory to a new transaction.

Each of the keys 13 (Fig. 2) has a key stem 25 guided for vertical movement in aligned slots formed in plates 26 and 27, the latter plates forming part of a keyboard frame supported by the machine frame. The lower edges of the key stems cooperate with spaced shoulders 28 formed on the aligned racks 12 to limit the forward advancement of each rack to a number of increments corresponding to the value of the key depressed in the associated row.

Spring means (not shown) are provided for normally holding the various keys in their illustrated raised positions, and means are further provided for latching the keys in rack arresting position upon depression thereof. For this purpose, each key has a cam lobe 29 engageable with a locking bail 30, each row of keys having such a bail. Each bail is pivoted at its opposite ends to front and rear upstanding walls 31 of the bottom plate 27. When a key 13 is depressed, it will rock its associated bail outwardly, and as the lobe 29 passes the bail, the latter will be retracted partially by a suitable spring (not shown) to a position wherein it latches the key in rack arresting position.

A zero block 32 depends from each lock bail 30 and when no key in a bank associated with a particular rack is depressed, a bail will locate the zero block in a position directly in front of one of the shoulders 28 of the rack, thereby preventing substantial forward movement of the rack during a succeeding cycle of the machine. However, when any amount key is depressed and latched down, its associated bail 30 will be held outwardly sufficiently to maintain its zero block out of the path of the aligned rack.

The machine is driven by a motor (not shown) through a cyclic clutch 33 (Fig. 4) having its driven side connected to a rotatable shaft 34. The clutch is effective to cause a complete rotation of the shaft 34 during each cycle of operation.

The machine is controlled to perform different operations by depressing various control bars, i.e. add bar 35, total bar 36, subtotal bar 37, tax bar 38, subtract bar 39, repeat bar 40, start key 18, and end-of-transaction bar 23. The add bar 35 is suitably connected, by means not shown herein but disclosed in the aforementioned Boyden patent, to a rock shaft 41 (Fig. 4) having an arm 42 clamped thereon and engageable with a pin 43 fastened on a clutch control bar 44. The add bar 35 is thereby effective through the rocking of shaft 41 to advance the clutch control bar 44 to the left to effect engagement of the clutch 33.

The clutch control bar 44 is connected through a hook 45 to a latch 46 by a pin 47. The latch 46 is part of a spring powered release device for causing engagement of the clutch 33 and is pivoted on a frame pin 48. A shoulder on the latch engages a roller 49 carried on a slide 50 supported for endwise movement by the frame pin 48 and another frame pin 51. When the latch is partially rotated clockwise, it will disengage the roller 49, thereby permitting the slide 50 to be driven to the left by a relatively heavy spring 52. As the slide 50 moves to the left, a lug 53 thereon strikes the pin 54 carried by a clutch control dog 55 thereby rocking the latter counterclockwise about a pivot support 260 to cause engagement of the clutch 33.

When the slide 50 is driven to the left, a shoulder 56 thereon moves adjacent a pin 57 carried by a cam follower 58. The latter is pivotally supported on the shaft 74 and is urged counterclockwise against a cam 59 keyed on the shaft 34 by a spring (not shown). Part way in the machine cycle, the cam 59 becomes effective to move the slide 50 through the follower 58 back to its latch position thereby permitting the dog 55 to be returned clockwise by the spring 60 to its normal clutch disengaging position shown in Fig. 4. The clutch control bar 44 is returned to normal position by spring 61.

The clutch dog 55 is also effective, when rocked counterclockwise, to engage the clutch, to rock a switch control lever 68 against the action of spring 69 thereby closing a switch 70 in the machine motor circuit.

Pins 62, 63, 64 and 65 (Figs. 3 and 4) underlie the stems of the control bars 36, 37, 38 and 39, respectively, and are fixed to individual cranks all pivoted on frame pins, like pin 264, and urged into upper illustrated positions by individual springs, like spring 1264. Each of the pins 62, 63, 64 and 65, when lowered, is effective to engage an inclined cam slot in the clutch control bar 44 whereby to advance the bar to effect engagement of the clutch.

Means (not shown) are provided for advancing the racks 12 toward the left during the first part of a machine cycle and for returning them to their illustrated home positions during the latter part of the cycle. The racks are provided with slots 71 and 72 which are slideably guided over rack support shafts 73 and 74, respectively. See Figure 2. The shaft 73 is slideably mounted in guide solts 75 (Fig. 3) formed in machine side frame plates 76, while the ends of the shaft 74 are fixed in the side frame plates.

In order to yieldably advance the various racks, each rack has opposed notches 77 located at the closed end of its slot 71, the notches being normally engaged by rollers 78 carried by pawls 79 pivotally mounted on the shaft 73. A spring 80 urges each pair of pawls in opposite direction, thereby yieldably holding the rollers 78 in driving engagement with the notches 77. However, during advancement of the shaft 73, when any of the racks 12 are blocked by a zero block 32 or the stem of a depressed key 13, the rollers 78 will ride out of the notches of the blocked rack and along the respective slot 71.

The racks are each operatively entrained with a respective one of a series of numeral printing wheels 81 of the amount printer 82. Each printer wheel is rotatably mounted on an individual arm 84 loosely keyed on a printer control shaft 85 and spring urged clockwise by a tension spring 86. A gear 87 integral with each printer wheel is maintained in continuous mesh with a gear 88 also carried by the respective arm 84. Except during a printing operation, the arms 84 are held in their respective illustrated positions by the shaft 85 wherein the gears 88 mesh with associated idler gears 89 rotatably journaled on a fixed shaft 90. The latter gears mesh continuously with offset rack sections 91 integrally mounted on the various racks 12.

During a mid-portion of each cycle and after various racks 12 have been differentially advanced to different positions permitted by depressed ones of the keys 13, the shaft 85 is rocked clockwise allowing the spring 86 to likewise rock the arms 84, if otherwise allowed to do so, causing the printing wheels 81 to move into printing contact with a printing ribbon 92 and the paper tape P at a point where the latter is supported around a platen 93. Means (not shown) are provided to automatically line space the platen as an incident to each machine cycle. Also, a platen advancing knob 223 is provided to enable manual advancement of the platen.

A symbol rack 83 (Fig. 3) is supported in a manner somewhat similar to that of the aforementioned racks 12 being guided over shaft 74 at one end and a frame pin 275 at the other. A detent pawl 99 is pivoted to the rack at 100 and is urged upwardly by a spring 101 to normally maintain a detent notch therein in embracement with the drive shaft 73. The symbol rack is advanced by the shaft 73 until one of its stop shoulders, like shoulder 104, engages a pin, like pin 65, which has been depressed by a control bar stem to a lowered position as indicated at 65a. At this time, the detent pawl 99 will yield, thereby positioning the rack to set a symbol printer wheel (not shown) entrained therewith in position to print a symbol indicative of the type of operation performed by the machine. Thus, lowering of the pins 62, 63, 64 and 65 perform two functions; first, engagement of the clutch and, second, the differential blocking of the symbol rack. However, the pin 62 associated with the total bar 36 is not effective itself upon depression of the total bar to stop the symbol rack at its "total" position although the pin itself is lowered to move the clutch control bar 44. Instead, arresting of the symbol rack at "total" position when the total bar 36 is depressed is effected by a foot 103 formed on the stem of the total bar which, when the total bar is depressed, is lowered into the broken line position 103a wherein it can block an aligned shoulder on the symbol rack.

However, the pin 62 (Fig. 4) is effective to stop the symbol rack at a more advanced position beyond the total position whenever the end-of-transaction bar 23 is depressed. For this purpose, the stem of the bar 23 is provided with an extension 111 which, when the bar is depressed, depresses the pin 62 to its lowermost position.

In accordance with the present invention, a program indicating device, generally indicated at 113 (Figs. 1 and 5 to 9, inclusive) is provided. The latter comprises a drum 121 on three faces of which are printed instructions for the machine operator to follow. Located at the right hand side of the machine is a rack 114 driven by the shaft 73 in the same manner as are the amount racks 12. The rack 114 is entrained through intermeshed gears 115 and 116, shaft 118 and intermeshed gears 119 and 120 (Fig. 3) with the symbol rack 83 located on the left hand side of the machine. Gears 115 and 119 are rotatably mounted on coaxial shafts 117 and 117a respectively. The purpose of the gear train is to arrest the rack 114 with the symbol rack 83 when the latter is arrested by depressed ones of pins associated with the control bars 36 to 39.

The drum 121 is hexagonal in cross section and is keyed to a shaft 122 journaled at its ends in brackets 123 and 124 so as to be read through an opening 125 (Figs. 1 and 2) provided in the top of a machine casing 126. Drum 121 carries instructions on alternate ones of the sides thereof as indicated at a, b, and c (see Fig 9 in particular). Also keyed on the shaft 122 is a three-toothed ratchet wheel 127 and a disc 128 having three indentations 129 spaced therearound whereby the disc may be prevented from accidental turning by a detent 130 pivoted at 131 upon a side frame 76 and urged against the edge of the disc by a spring 208.

Freely journaled on the shaft 122 is a Geneva-like gear 132 having a body extension 133 at one side thereof upon which is pivoted at 134 a pawl 135 urged by a spring 136 into engagement with the ratchet 127. A segmental gear 137 having two sections 138 and 139 located in side by side relation is pivoted on a frame pin 140 and has a driven connection, through a link 141, to the rack 114. The gear 132 is also integrally formed with two sets of gear teeth, one set having two teeth 142 and 143, and the other set having four teeth 144 to 147. The tooth 145 is located behind and formed integral with the tooth 143 so as to mesh between the two teeth 148 and 149 of the gear section 138.

In a cycle initiated by depression of a subtotal key 37, the racks 83 and 114 move together three increments before being stopped by the lowered pin 63. In a totaling cycle a four increment movement of the latter racks occurs before being stopped by the foot 103. In an end-of-transaction cycle, a seven increment movement of the racks occurs before the racks are stopped by the pin 62. In a subtract cycle a one increment movement of the racks occurs before the racks are arrested.

The rack 137 and gear 132 are so formed and timed that three increments of symbol rack movement will move the pawl 135 clockwise from a position overlapping one tooth of the ratchet wheel 127 to a position overlapping the next tooth of the ratchet, i.e. from tooth 150 (Fig. 7) to tooth 151, the gear 132 rotating from the full line position toward the broken line position of Fig. 8. When the racks 83 and 114 return to their positions of Figs. 3 and 5, the rack 137 will return the gear 132 to the full line position of Fig. 8, thereby causing the pawl 135 to pull the drum 121 around one-third of a revolution, i.e. the drum surface b will move up (Figs. 5 and 7) to reading position formerly occupied by the surface a. When the racks 83 and 114 move through their four and seven increment travels in response to depression of the bars 36 and 23, respectively, the teeth 142 and 143 slide along the smooth portion of the sector 137. Therefore, only one tooth of the ratchet 127 is overlapped by pawl 135 so that the drum 121 is never pulled more than one-third of a revolution at a time.

The symbol rack movement induced by depression of the bars 39 and 38 are only one and two increments, respectively. Therefore, the pawl 135 does not move a full one-third of a revolution and the next tooth of the ratchet 127 is not overlapped. Consequently, the pawl 135 moves back to its former position without advancing the drum.

To operate the machine, the clerk may refer to the program indicator drum which normally is located with the face a visible in the opening 125. As indicated thereon, he first depresses the start key 18 to unlock the control bars and then enters the amount and identification number of the first item and the department number into the keyboard and depresses the add bar 35, thereby engaging the clutch 33. A form printer (not shown) operable by the shaft 34 and rendered effective by the depression of the start key will now operate to print a heading including store name, etc., as indicated at 250 in Fig. 10.

During the "start" operation and any and all subsequent add operations, the symbol rack does not advance and therefore the program indicating drum remains in its initial position.

Should the subtract key be depressed, the symbol rack will advance one increment, but this will be insufficient to advance the program indicating drum. However, upon depression of the subtotal bar 37 the symbol rack will advance three increments whereby during its return the drum 121 will be advanced to present its face b in the opening 125.

Following computation of the taxes and entry thereof into the machine by depression of the tax bar 38, the total bar 36 is depressed, effecting a total printing. Since the symbol rack advances a total of four increments during this operation, the drum will again be advanced to present its face c in the opening 125.

Subsequently, upon depression of the end-of-transaction bar 23, the symbol rack will move forwardly to its fullest extent until it is stopped by the depressed pin 62. During this movement, a cam plate 226 (Fig. 3) attached to the symbol rack engages a pin 227 (Fig. 4) carried by the hook 45, thereby lifting the hook and disengaging it from the pin 47. Also, the rack 114 (Fig. 5) in moving its fullest extent will cause a pin 228, extending through a slot 229 in a bar 230, to pick up the bar and move it leftwardly. The bar is slideably attached to the rack 114 by a pin 231. When the bar 230 is thus carried fully to the left, a pin 232 fixed on the stem of the start key 18 will snap up behind the bar under the action of a spring 233 thereby locking the bar in its lefthand position. In the latter position, the left hand end of bar 230 is thrust against an arm 234 clamped on the shaft 41 and thereby, through the lever 42, holds the clutch control bar 44 in its leftmost position wherein shoulders 66 thereon underlie the various pins 62, 63, 64 and 65 to block all associated control bars from being depressed. However, the clutch control dog 55 is permitted to fall back because of release of the hook 45 by cam 226 to enable disengagement of the clutch when the machine has completed its cycle.

The symbol racks 83 and 114 are returned to their initial right hand positions during the latter half of the end-of-transaction cycle, thereby causing the pawl 135 to advance the program drum 121 to its initial position wherein the surface a is located in reading position. The machine will now remain locked until the start key is again depressed. When the start key is depressed, it will also close the switch 236 which may be included in suitable control circuits such as the tape punch. Since the cam plate 226 is removed from engagement with the pin 227 during the latter half of each cycle and the clutch control bar 44 is permitted to return to its right hand position upon depression of the start key, the hook 45 will again return to a position wherein it will be coupled to the latch 46.

Having thus described the invention, what we desire to secure by United States Letters Patent is:

1. In a sales transaction machine, an accumulator, differential actuators therefor, selecting mechanism for differentially controlling said actuators, operating mechanism for said differential actuators including a plurality of depressible control bars; each of said bars being effective upon depression to cause said actuators to actuate said accumulator, a program indicating device settable into different ones of a plurality of indicating conditions, said indicating device containing indicia for indicating in any of said conditions thereof the next successive one of said bars to depress, and means operable in response to the depression of each of said bars for advancing said indicating device from one of said indicating conditions to another.

2. In a sales transaction machine, an accumulator, differential actuators therefor, selecting mechanism for differentially controlling said differential actuators, operating mechanism for said differential actuators including a plurality of depressible control bars; each of said bars being effective upon depression thereof to cause said actuator to actuate said accumulator, a program indicating device settable into different ones of a plurality of indicating conditions, said indicating device containing indicia for indicating in any of said conditions thereof the next successive one of said bars to depress, and means responsive to certain only of said bars upon depression thereof for advancing said indicating device from one of said indicating conditions to another.

3. In a sales transaction machine, an accumulator, differential actuators therefor, selecting mechanism for differentially controlling said actuators, operating mechanism for said differential actuators including a plurality of depressible control bars; a differentially movable control element, each of said bars being effective upon depression thereof to cause said actuators to actuate said accumulator and to differentially control the extent of movement of said control element into different positions, a program indicating device settable into different ones of a plurality of indicating conditions, said indicating device containing indicia for indicating in any of said conditons thereof the next successive one of said bars to depress, and means responsive to movement of said control element into different ones only of said positions thereof for advancing said indicating device from one indicating condition to another.

4. In a sales transaction machine, an accumulator, differential actuators therefor, selecting mechanism for differentially controlling said actuators, operating mechanism for said differential actuators including a plurality of depressible control bars; a differentially movable control element, each of said bars being effective upon depression thereof to cause said actuators to actuate said accumulator and to differentially control the extent of movement of said control element into different positions, a program indicating drum settable into different ones of a plurality of indicating positions, said indicating drum containing indicia for indicating in any of said positons thereof the next successive one of said bars to depress, and pawl and ratchet mechanism comprising a pawl operable by said control member and a ratchet cooperable with said pawl and operatively connected to said indicating drum for advancing said indicating drum from one indicating position to another, said pawl and ratchet mechanism being effective to advance said drum upon movement of said control element to certain of said positions thereof, said ratchet having teeth spaced sufficiently to prevent advancement thereof by said pawl upon movement of said control element to certain other of said positions.

5. In a sales transaction machine, an accumulator, differential actuators therefor, selecting mechanism for differentially controlling said differential actuators, operating mechanism for said differential actuators including a plurality of depressible control bars; each of said bars being effective upon depression thereof to cause said actuators to actuate said accumulator, a program indicating drum rotatable into different program indicating positions, said indicating drum containing indicia for indicating in any of said positions thereof the next successive one of said bars to depress, and means operable by said operating means in response to depression of certain only of said bars for advancing said drum from one of said indicating positions to another.

References Cited in the file of this patent

UNITED STATES PATENTS

| | | |
|---|---|---|
| 1,363,121 | Jones | Dec. 21, 1920 |
| 1,817,451 | Gubelmann | Aug. 4, 1931 |